United States Patent
Li et al.

(10) Patent No.: US 11,167,433 B2
(45) Date of Patent: Nov. 9, 2021

(54) SEALING APPARATUS AND ARTICULATED ROBOT

(71) Applicant: Flexiv Ltd., Santa Clara, CA (US)

(72) Inventors: Xuesen Li, San Mateo, CA (US); Shiquan Wang, Foster City, CA (US)

(73) Assignee: Flexiv Ltd., Grand Cayman (KY)

( * ) Notice: Subject to any disclaimer, the term of this patent is extended or adjusted under 35 U.S.C. 154(b) by 176 days.

(21) Appl. No.: 16/545,433

(22) Filed: Aug. 20, 2019

(65) Prior Publication Data

US 2020/0101628 A1    Apr. 2, 2020

Related U.S. Application Data

(60) Provisional application No. 62/740,190, filed on Oct. 2, 2018.

(51) Int. Cl.

| | |
|---|---|
| *B25J 17/00* | (2006.01) |
| *B25J 17/02* | (2006.01) |
| *B25J 18/00* | (2006.01) |
| *B25J 19/00* | (2006.01) |
| *B25J 9/12* | (2006.01) |

(52) U.S. Cl.
CPC .......... *B25J 19/0075* (2013.01); *B25J 9/126* (2013.01); *B25J 17/00* (2013.01)

(58) Field of Classification Search
CPC .... B25J 19/0075; F16J 15/3268; F16J 15/022
See application file for complete search history.

(56) References Cited

U.S. PATENT DOCUMENTS

| | | | | |
|---|---|---|---|---|
| 4,413,830 | A * | 11/1983 | Pietsch ............... | B63H 23/321 277/364 |
| 5,979,903 | A * | 11/1999 | Kwasniewski ...... | F16J 15/3256 277/423 |
| 10,113,644 | B2 * | 10/2018 | Taylor .................. | F16J 15/002 |
| 2002/0159852 | A1 | 10/2002 | Katsuzawa et al. | |

(Continued)

FOREIGN PATENT DOCUMENTS

| | | |
|---|---|---|
| CN | 104552277 | 4/2015 |
| CN | 104812536 | 7/2017 |
| CN | 108582163 | 9/2018 |

(Continued)

OTHER PUBLICATIONS

International Search Report for International Application No. PCT/CN2019/107393, dated Jan. 8, 2020 (7 pages).

*Primary Examiner* — Jake Cook
(74) *Attorney, Agent, or Firm* — K&L Gates LLP

(57) ABSTRACT

The present disclosure describes a sealing apparatus for a robot and an articulated robot utilizing the sealing apparatus. In one embodiment, the sealing apparatus includes a first enclosure and a second enclosure. The second enclosure may be rotatably connected to the first enclosure such that the first enclosure and the second enclosure cooperatively define a gap between the first enclosure and the second enclosure. The sealing apparatus may further include a seal disposed in the gap such that the seal and the second enclosure cooperatively define a chamber. The sealing apparatus also includes an elastomer disposed in the chamber. The elastomer may be compressed by the seal and the second enclosure to generate an elastic force that presses the seal against the first enclosure.

17 Claims, 5 Drawing Sheets

(56) References Cited

U.S. PATENT DOCUMENTS

2008/0061517 A1* 3/2008 Eijkelenberg .......... F16J 15/064
 277/637
2009/0008880 A1* 1/2009 Bodmann .............. H05K 5/063
 277/368

FOREIGN PATENT DOCUMENTS

JP  06264903  9/1994
JP  08330777  12/1996

* cited by examiner

SEALING APPARATUS AND ARTICULATED ROBOT

PRIORITY INFORMATION

The present application claims the benefit of priority under 35 U.S.C § 119(e) to U.S. Provisional Patent Application Ser. No. 62/740,190, entitled "SEALING APPARATUS AND ARTICULATED ROBOT" and filed on Oct. 2, 2018, the disclosures of which is herein incorporated by reference in its entirety.

TECHNICAL FIELD

The present disclosure generally relates to robotic systems and techniques, and in particular to a sealing apparatus and an articulated robot.

BACKGROUND

Waterproof and dustproof structures are often provided to protect the internal electrical components of robots. In related art, a driving device may be incorporated into a joint section of an articulated robot to drive an arm or a wrist of the robot. A seal, e.g., an oil seal, may be set in a relatively moveable region of an output shaft of the driving device. Such seals usually have complex designs with a bulky size and high friction, which leads to a high cost of the sealing structure and the robot.

SUMMARY

The present disclosure provides a sealing apparatus and a robot including the sealing apparatus in order to address the above-identified problems. In one embodiment, a sealing apparatus for a robot is provided. The sealing apparatus may include a first enclosure and a second enclosure. The second enclosure may be rotatably connected to the first enclosure such that the first enclosure and the second enclosure cooperatively define a gap between the first enclosure and the second enclosure. The sealing apparatus may further include a seal disposed in the gap such that the seal and the second enclosure cooperatively define a chamber. The sealing apparatus also includes an elastomer disposed in the chamber. The elastomer may be compressed by the seal and the second enclosure to generate an elastic force that presses the seal against the first enclosure.

In another embodiment, the first enclosure includes a first body and a first protrusion extending from the first body towards the second enclosure. The second enclosure may also include a second body and a second protrusion. The second protrusion may extend from the second body towards the first enclosure and may be spaced apart from the first protrusion such that the gap is formed. The seal may also include a main body, a first end, and a second end. The first end of the seal may protrude from the main body towards the first enclosure and may match the first protrusion. The second end of the seal may protrude from the main body towards the second enclosure, and the second end of the seal and the second protrusion may cooperatively define the chamber.

In yet another embodiment, the first end of the seal defines a first annular recess extending along a circumference of the seal. The first protrusion may also extend along a circumference of the first enclosure. At least a portion of the first protrusion may be located within the first annular recess and the first end of the seal may abut the first body of the first enclosure.

In a further embodiment, the first end and the main body of the seal both have an annular cylindrical configuration. A thickness of the first end may be less than a thickness of the main body to form a first flanged surface at an outer side of the seal. The first protrusion may also abut the first flanged surface.

In a still further embodiment, the second end of the seal defines a second annular recess extending along a circumference of the seal. The second protrusion may also extend along a circumference of the second enclosure. At least a portion of the second protrusion may be located within the second annular recess and the second end of the seal may abut the second body of the second enclosure. The second protrusion may also be spaced apart from a bottom wall of the second annular recess such that the chamber is formed between the bottom wall of the second annular recess and the second protrusion.

In another embodiment, the second end and the main body of the seal both have an annular cylindrical configuration. A thickness of the second end may also be less than a thickness of the main body to form a second flanged surface at an outer side of the seal. The second protrusion may also be spaced apart from the second flanged surface such that the chamber is formed between the second flanged surface and the second protrusion.

In yet another embodiment, the seal comprises a transparent plastic material.

In a further embodiment, the sealing apparatus further comprises a lighting device connected to the first enclosure or the second enclosure. The lighting device may be located at an inner side of the seal, and a light-emitting surface of the lighting device may be directed towards the seal.

In a still further embodiment, the sealing apparatus further comprises a processor coupled to the lighting device. The processor may be configured to receive robot condition information and to instruct the lighting device to change a lighting mode based on the robot condition information.

In another embodiment, the first enclosure and the second enclosure cooperatively constitute a pitch joint or a roll joint.

In yet another embodiment, an articulated robot is provided that includes a first enclosure and a second enclosure. The first enclosure and the second enclosure cooperatively define a gap between the first enclosure and the second enclosure. The articulated robot may also include a driving device connected to the first enclosure and the second enclosure. The driving device may be configured to drive the first enclosure and the second enclosure to rotate relative to each other based on movement indication of the articulated robot. The articulated robot may further include a seal disposed in the gap. The seal and the second enclosure cooperatively define a chamber. The articulated robot may also include an elastomer disposed in the chamber. The elastomer may compressed by the seal and the second enclosure, to generate an elastic force that presses the seal against the first enclosure.

In a further embodiment, the first enclosure comprises a first protrusion extending towards the second enclosure. The second enclosure may also include a second protrusion extending towards the first enclosure and spaced apart from the first protrusion such that the gap is formed. The seal may also include a main body, a first end, and a second end. The first end of the seal may protrude from the main body towards the first enclosure and matching the first protrusion. The second end of the seal may protrude from the main body towards the second enclosure. The second end of the seal and the second protrusion may cooperatively define the chamber.

In a still further embodiment, the first end of the seal defines a first annular recess extending along a circumference of the seal. The first protrusion may also extend along a circumference of the first enclosure, and at least a portion of the first protrusion may be located within the first annular recess and may abut a bottom wall of the first annular recess.

In another embodiment, the first end and the main body of the seal both have an annular cylindrical configuration. A thickness of the first end may be less than a thickness of the main body to form a first flanged surface at an outer side of the seal. The first protrusion may also abut the first flanged surface.

In yet another embodiment, the second end of the seal defines a second annular recess extending along a circumference of the seal. The second protrusion may extend along a circumference of the second enclosure. At least a portion of the second protrusion may be located within the second annular recess. The second protrusion may be spaced apart from a bottom wall of the second annular recess such that the chamber is formed between the bottom wall of the second annular recess and the second protrusion.

In a further embodiment, the second end and the main body of the seal both have an annular cylindrical configuration. A thickness of the second end may be less than a thickness of the main body to form a second flanged surface at an outer side of the seal. The second protrusion may be spaced apart from the flanged surface such that the chamber is formed between the flanged surface and the second protrusion.

In a still further embodiment, the seal comprises a transparent plastic material.

In another embodiment, the articulated robot further comprises a lighting device connected to the first enclosure or the second enclosure. The lighting device may be located at an inner side of the seal and may correspond to a location of the seal. A light-emitting surface of the lighting device is towards the seal.

In yet another embodiment, the articulated robot further comprises a processor coupled to the lighting device. The processor may be configured to receive robot condition information and to instruct the lighting device to change a lighting mode based on the robot condition information.

In a further embodiment, the first enclosure and the second enclosure cooperatively constitute a pitch joint or a roll joint.

According to the present disclosure, the seal may be directly disposed in the gap between the first enclosure and the second enclosure, and an elastomer may be compressed by the seal and the second enclosure such that the gap may be sealed by the seal and the elastomer. Thus, the implementation of the present disclosure may achieve the sealing between the first enclosure and the second enclosure of the robot with a simple structure. Therefore, the cost and the assembling effort of the robot may be reduced.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE DRAWINGS

To more clearly explain the technical solutions in the embodiments of the present disclosure, the drawings used in the description of the embodiments will be briefly described below. The drawings in the following description are merely exemplary embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. The described embodiments are only a part of the embodiments of the present disclosure, not all of the embodiments. All other embodiments obtained by a person of ordinary skill in the art based on the embodiments of the present invention without creative efforts fall within the scope of the present invention.

Figure 1:
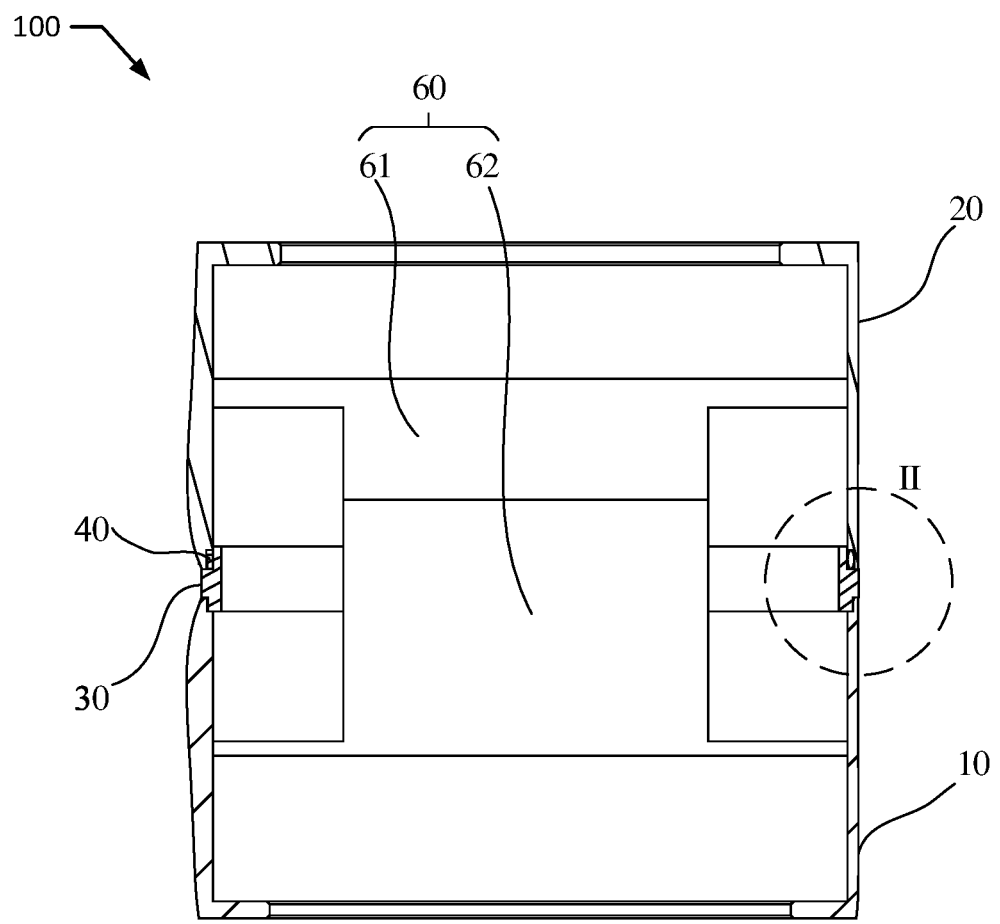
FIG. 1 illustrates a section view of a sealing apparatus for a robot according to an exemplary embodiment of the present disclosure.
Figure 2:
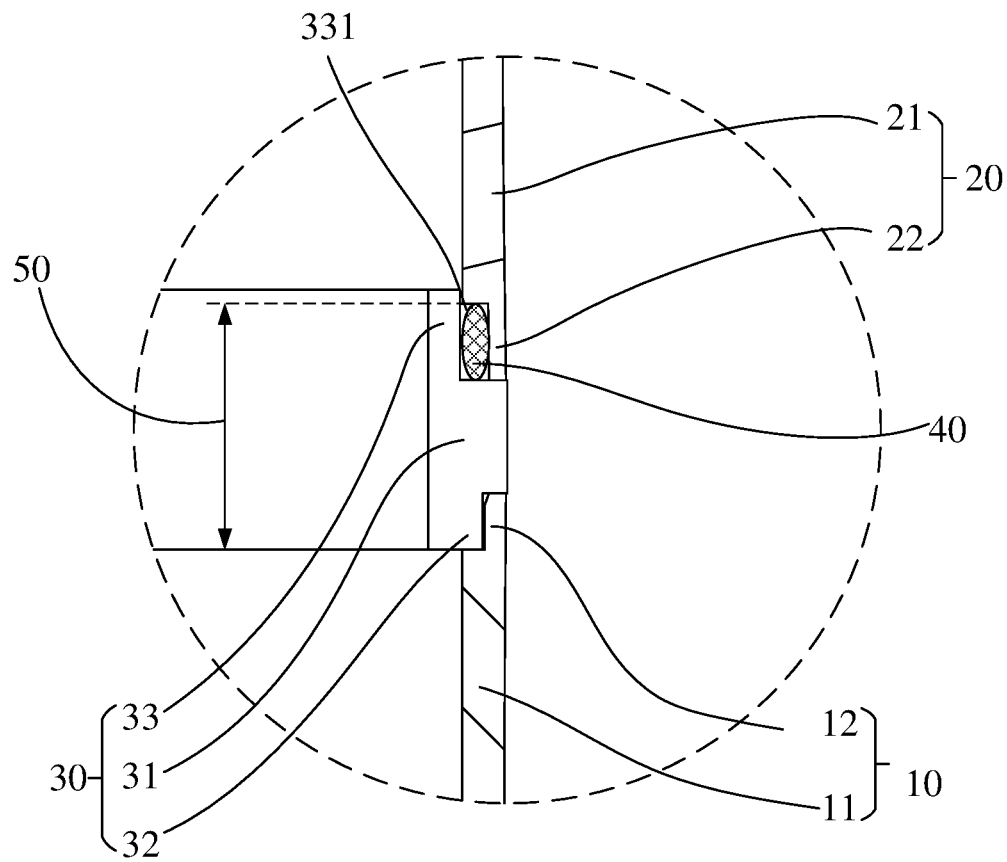
FIG. 2 illustrates an enlarged view of zone II of the exemplary embodiment depicted in FIG. 1.

FIGS. 1 and 2 show a sealing apparatus 100 for a robot according to an exemplary embodiment of the present disclosure. The sealing apparatus 100 as illustrated includes a first enclosure 10, a second enclosure 20, a seal 30, and an elastomer 40.

The first enclosure 10 and the second enclosure 20 may be the enclosures of two adjacent arms of a robot. The second enclosure 20 may be rotatably connected to the first enclosure 10. Specifically, a driving device 60, e.g., a motor or a rotary cylinder, including a stator 61 and a rotor 62 may be disposed within the two enclosures 10, 20, and one of the stator 61 and rotor 62 of the driving device may be connected to the first enclosure 10 while the other one of the stator 61 and rotor 62 of the driving device may be connected to the second enclosure 20 such that the first enclosure 10 may rotate relative to the second enclosure 20. For example, in the embodiment of FIG. 1, the stator 61 is connected to the second enclosure 20 while the rotor 62 is connected to the first enclosure 10.

The first enclosure 10 and the second enclosure 20 may be made of the same material, such as steel, aluminum, or an alloy. In other embodiments, the first enclosure 10 and the second enclosure 20 may be made of different materials. The first enclosure 10 and the second enclosure 20 may cooperatively define a gap 50 therebetween. In other words, the end of the first enclosure 10 facing the second enclosure 20 may be spaced apart from the end of the second enclosure 20 facing the first enclosure 10.

In certain embodiments, the seal 30 may be made of plastic, silicone rubber or other materials suitable for sealing structure. The seal 30 may be disposed in the gap 50 and configured to seal the gap 50. Specifically, the seal 30 and the second enclosure 20 may cooperatively define a chamber 331. The elastomer 40 may be disposed in the chamber 331 where the elastomer 40 is compressed by the seal 30 and the second enclosure 20. The elastomer 40 may be made of material with a certain elasticity such as rubber, plastic, and the like. The size and shape of the elastomer 40 may be in accordance with that of the chamber 311. Accordingly, the seal 30 may press against the first enclosure 10 due to an elastic force generated by the deformation of the elastomer 40. The gap 50 may thereby be sealed by the seal 30 and the elastomer 40.

Optionally, the end of the first enclosure 10 facing the second enclosure 20 may have a circular profile as well as the end of the second enclosure 20 facing the first enclosure 10, such that when connected together the first enclosure 10 and the second enclosure 20 may rotate smoothly. In this circumstance, the seal 30 may also have an annular configuration corresponding to the first enclosure 10 and the second enclosure 20.

According to the present disclosure, the seal 30 may be directly disposed in the gap 50 between the first enclosure 10 and the second enclosure 20, and an elastomer 40 may be compressed by the seal 30 and the second enclosure 20 such that the gap 50 may be sealed by the seal 30 and the elastomer 40. The above-discussed embodiment may therefore achieve adequate sealing between the first enclosure 10 and the second enclosure 20 of the robot with a simpler structure than conventional designs. Therefore, the cost of the robot may be reduced.

In one embodiment, as shown in FIG. 2, the first enclosure 10 may include a first body 11 and a first protrusion 12. The first protrusion 12 may extend from the first body 11 towards the second enclosure 20. Similarly, the second enclosure 20 may include a second body 21 and a second protrusion 22. The second protrusion 22 may extend from the second body 21 towards the first enclosure 10. The first protrusion 12 (and/or the first body 11) may be spaced apart from the second protrusion 22 (and/or the second body 21) such that the gap 50 may be formed therebetween. In such embodiments, the seal 30 may include a main body 31, a first end 32, and a second end 33. The first end 32 of the seal 30 may protrude from the main body 31 towards the first enclosure 10, and may match the shape of the first protrusion 12. The second end 33 of the seal 30 may protrude from the main body 31 towards the second enclosure 20. The second end 33 of the seal 30 and the second protrusion 22 may cooperatively define the chamber 331 mentioned above.

Referring to FIGS. 3a-3d, the first enclosure 10, the second enclosure 20, the seal 30, and the elastomer 40 may have different configurations. FIGS. 3a-3d show several exemplary sealing apparatuses 300, 302, 304, 306.

Figure 3A:
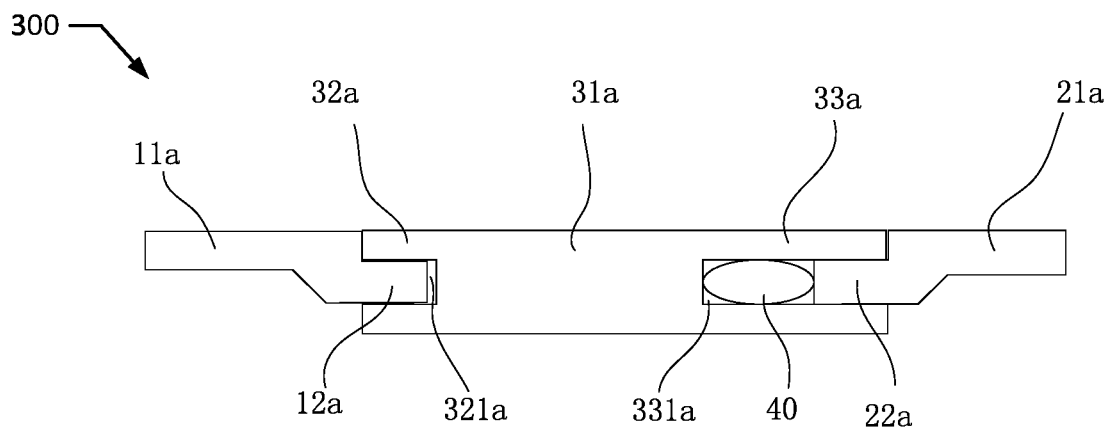
FIGS. 3a-3d illustrate several configurations of the sealing apparatus according to exemplary embodiments of the present disclosure.
Figure 3B:
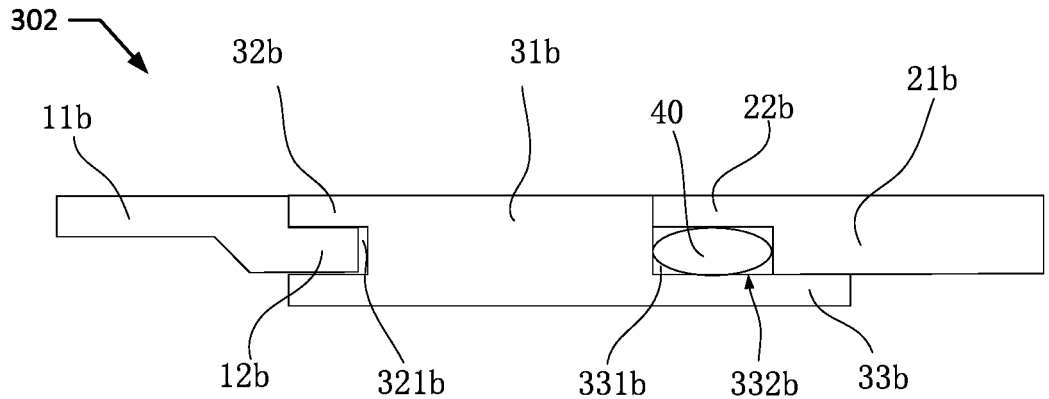

In some embodiments, the first end 32a, 32b of the seal 30 may defines a first annular recess 321a, 321b, such as in the sealing apparatuses 300, 302 of FIGS. 3a and 3b. Although only an exemplary section view is shown in FIGS. 3a and 3b, those skilled in the art should understand that the first annular recess 321a, 321b may extend along a circumference of the seal 30. Similarly, the first protrusion 12a, 12b may extend along a circumference of the first enclosure 10. All or part of the first protrusion 12a, 12b may be located within the first annular recess 321a, 321b. The first end 32a, 32b of the seal 30 may abut the first body 11a, 11b of the first enclosure 10. In other words, once sealed there may be no gap or opening between the first end 32a, 32b of the seal 30 and the first body 11a, 11b of the first enclosure 10, and water or dust may be prevented from entering an inner side of the first enclosure 10 and the seal 30.

Figure 3C:
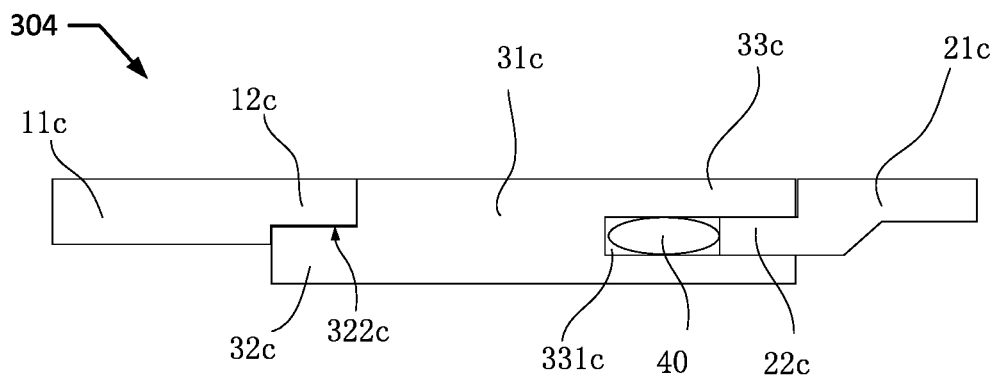
Figure 3D:
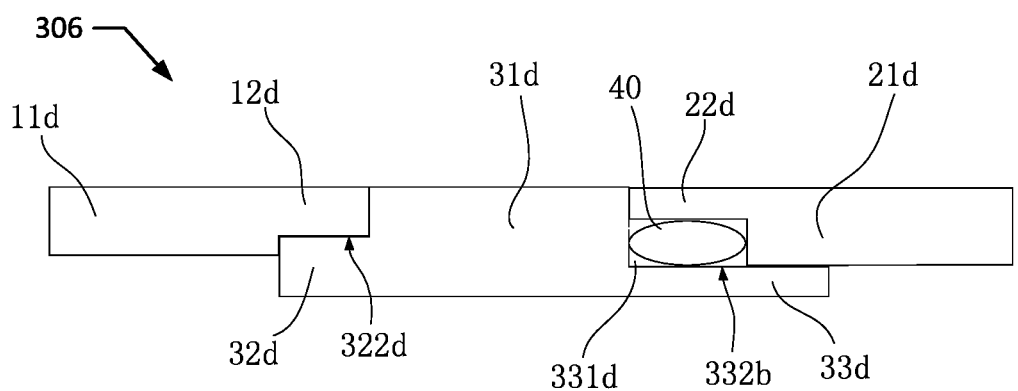

In other embodiments, the first end 32c, 32d and the main body 31c, 31d of the seal 30 may both have annular cylindrical configurations, such as in the sealing apparatuses 304, 306 of FIGS. 3c and 3d. In such implementations, the thickness of the first end 32c, 32d may be less than the thickness of the main body 31c, 31d, and may thereby form a first flanged surface 322c, 322d at an outer side of the seal 30. The first protrusion 12c, 12d of the first enclosure 10 may abut the first flanged surface 322c, 322d such that dust or water is prevented from entering the inner side of the sealing apparatus 304, 306.

In some embodiments, the second end 33a, 33c of the seal 30 may defines a second annular recess 331a, 331c, as with the sealing apparatuses 300, 304 shown in FIGS. 3a, 3c. Although only an exemplary section view is shown in FIGS. 3a, 3c, one skilled in the art should understand that the second annular recess 331a, 331c may extend along a circumference of the seal 30. Similarly, the second protrusion 22a, 22c may extend along a circumference of the second enclosure 20. All or part of the second protrusion 22a, 22c may be located within the second annular recess 331a, 331c. The second end 33a, 33c of the seal 30 may abut the second body 21a, 21c of the second enclosure 20 while the second protrusion 22a, 22c may be spaced apart from the bottom wall of the second annular recess 331a. In such implementations, the chamber 331 may be formed between the bottom wall of the second annular recess 331a, 331c and the second protrusion 22a, 22c. In fact, the chamber 331 may be a portion of the second annular recess 331a, 331c which is not occupied by the second protrusion 22a, 22c. Since the elastomer 40 may be compressed in the chamber 331, water and dust may be prevented from entering the inner side of the sealing apparatus 300, 304.

In other embodiments, the second end 33b, 33d and the main body 31b, 31d of the seal 30 may both have an annular cylindrical configuration, as shown in the sealing apparatuses 302, 306 of FIGS. 3b and 3d. In such embodiments, the thickness of the second end 33b, 33d may be less than the thickness of the main body 31b, 31d, and thereby forming a second flanged surface 332b, 332d at an outer side of the seal 30. The second protrusion 22b, 22d of the second enclosure 20 may be spaced apart from the second flanged surface 332b, 332d, and the chamber 331b, 331d may thereby be formed between the second protrusion 22b, 226 and the second enclosure 20. Since the elastomer 40 may be compressed in the chamber 331b, 331d, to prevent water or dust from entering the inner side of the seal 30.

Figure 4:
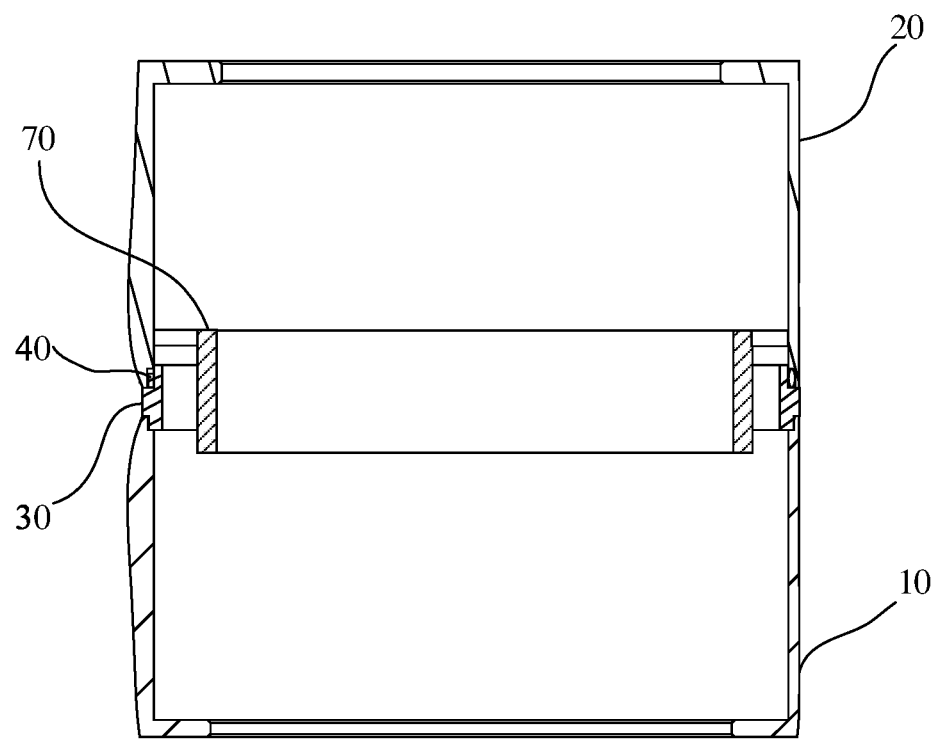
FIG. 4 illustrates a section view of a sealing apparatus for a robot according to an exemplary embodiment of the present disclosure.

In some embodiments, the seal 30 may be made of transparent or translucent plastic material, which does not cause a significant friction when the first enclosure 10 rotates relative to the second enclosure 20. In certain implementations, as shown in FIG. 4, the sealing apparatus may further include a lighting device 70. The lighting device 70 may be disposed at an inner side of the seal 30 and corresponding to the location of the seal 30. In this embodiment, the lighting device 70 is connected to the second enclosure 20. In other embodiments, the lighting device 70 may alternative be connected to the first enclosure 10. The lighting device 70 may include any kind of light-emitting components. The lighting device 70 may have an annular configuration extending along the entire circumference of the first and second enclosures 10, 20. Alternatively, the lighting device 70 may include several separated sub-lighting elements arranged along the circumference of the first and second enclosures 10, 20. The light-emitting surface of the lighting device may face the seal 30 such that the lighting device 70 may be utilized to illuminate the transparent or translucent seal 30, allowing the operator of the robot to easily observe the condition of the seal 30 and/or the robot.

In some embodiments, the sealing apparatus may further include a processor (not shown) coupled to the lighting device 70. The robot on which the sealing apparatus is installed may include several sensors, such as vibration detectors and temperature sensors. The information collected by these sensors may be utilized to determine an operation condition of the robot. The processor may receive the robot condition information and instruct the lighting device 70 to change a lighting mode based on the operation condition. For example, when the robot functions normally, the processor may instruct the lighting device 70 to emit light continuously. When vibration levels of the robot are too high, the processor may instruct the lighting device 70 to flash at a certain frequency. Or when the temperature of the robot is above a pre-determined threshold, the processor may control the lighting device 70 to change its light color. It should be appreciated that the foregoing are merely exemplary lighting modes of the lighting device 70. In practice, the designer of the sealing apparatus or the robot may employ other lighting modes, which are also considered within the scope of the present disclosure. One or more of the above-discussed functions of the processor may be implemented in combination with a memory. For example, the memory may store instructions which, when executed by the processor, cause the processor to implement the above-described functions.

Figure 5:
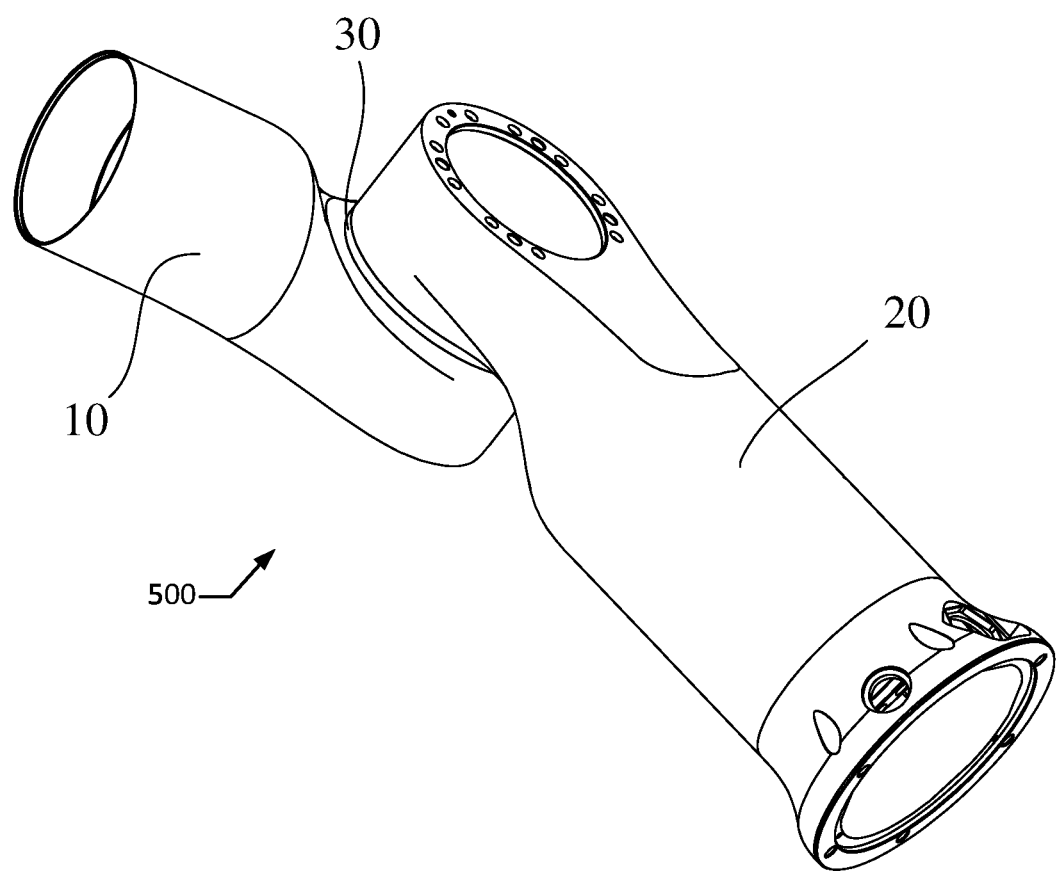
FIG. 5 shows a perspective view of an articulated robot according to an exemplary embodiment of the present disclosure.

FIG. 5 depicts a robotic joint 500 according to an exemplary embodiment of the present disclosure. The robotic joint 500 includes a first enclosure 10 and a second enclosure 20 cooperatively constituting a pitch joint, sealed by a seal 30. In other implementations, the first enclosure 10 and the second enclosure 20 may cooperatively constitute a roll joint.

The present disclosure further provides an articulated robot with a sealing apparatus as recited in any of the embodiments described above. The articulated robot may include one or more robotic joints 500. For example, the articulated robot may include a first enclosure, a second enclosure, a driving device, a seal, and an elastomer. The first enclosure and the second enclosure may cooperatively define a gap therebetween. The driving device may be connected to the first enclosure and the second enclosure, and may be utilized to drive the first enclosure and the second enclosure to rotate relative to each other based on movement indication of the articulated robot. The seal may be disposed in the gap, where the seal and the second enclosure may cooperatively define a chamber. The elastomer may be disposed in the chamber. The elastomer may be compressed by the seal and the second enclosure such that the seal may cling to the first enclosure under an elastic force generated by the deformation of the elastomer. Thus, the gap between the first enclosure and the second enclosure may be sealed by the seal and the elastomer.

The detailed structure of the first enclosure, the second enclosure, the seal, the elastomer, the driving device or any other components of the articulated robot may be similar to the embodiments described above.

The foregoing are merely exemplary embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:
1. A sealing apparatus for robot, comprising:
a first enclosure;
a second enclosure rotatably connected to the first enclosure, wherein the first enclosure and the second enclosure cooperatively define a gap between the first enclosure and the second enclosure,
wherein the first enclosure comprises a first body and a first protrusion extending from the first body towards the second enclosure,
wherein the second enclosure comprises a second body and a second protrusion, the second protrusion extends from the second body towards the first enclosure and is spaced apart from the first protrusion such that the gap is formed;
a seal disposed in the gap, wherein the seal and the second enclosure cooperatively define a chamber,
wherein the seal comprises a main body, a first end, and a second end, the first end of the seal protrudes from the main body towards the first enclosure and matches the first protrusion, the second end of the seal protrudes from the main body towards the second enclosure, and the second end of the seal and the second protrusion cooperatively define the chamber; and
an elastomer disposed in the chamber, wherein the elastomer is compressed by the seal and the second enclosure, generating an elastic force that presses the seal against the first enclosure.

2. The sealing apparatus of claim 1, wherein
the first end of the seal defines a first annular recess extending along a circumference of the seal, and
the first protrusion extends along a circumference of the first enclosure, at least a portion of the first protrusion is located within the first annular recess, and the first end of the seal abuts the first body of the first enclosure.

3. The sealing apparatus of claim 1, wherein
the first end and the main body of the seal both have an annular cylindrical configuration, and a thickness of the first end is less than a thickness of the main body to form a first flanged surface at an outer side of the seal, and
the first protrusion abuts the first flanged surface.

4. The sealing apparatus of claim 1, wherein
the second end of the seal defines a second annular recess extending along a circumference of the seal;
the second protrusion extends along a circumference of the second enclosure, at least a portion of the second protrusion is located within the second annular recess, the second end of the seal abuts the second body of the second enclosure, and the second protrusion is spaced apart from a bottom wall of the second annular recess such that the chamber is formed between the bottom wall of the second annular recess and the second protrusion.

5. The sealing apparatus of claim 1, wherein
the second end and the main body of the seal both have an annular cylindrical configuration, and a thickness of the second end is less than a thickness of the main body to form a second flanged surface at an outer side of the seal, and
the second protrusion is spaced apart from the second flanged surface such that the chamber is formed between the second flanged surface and the second protrusion.

6. The sealing apparatus of claim 1, wherein the seal comprises a transparent or translucent plastic material.

7. The sealing apparatus of claim 6, further comprising:
a lighting device connected to the first enclosure or the second enclosure, wherein the lighting device is located at an inner side of the seal, and a light-emitting surface of the lighting device is directed towards the seal.

8. The sealing apparatus of claim 7, further comprising:
a processor coupled to the lighting device, wherein the processor is configured to receive robot condition information and to instruct the lighting device to change a lighting mode based on the robot condition information.

9. The sealing apparatus of claim 1, wherein the first enclosure and the second enclosure cooperatively constitute a pitch joint or a roll joint.

10. A sealing apparatus for a robot, comprising:
a first enclosure;
a second enclosure, wherein the first enclosure and the second enclosure cooperatively define a gap between the first enclosure and the second enclosure;
a driving device connected to the first enclosure and the second enclosure, wherein the driving device is configured to drive the first enclosure and the second enclosure to rotate relative to each other based on movement indication of the articulated robot;
a seal disposed in the gap, wherein the seal and the second enclosure cooperatively define a chamber, and wherein the seal comprises a transparent or translucent plastic material;
a lighting device connected to the first enclosure or the second enclosure, wherein the lighting device is located at an inner side of the seal and corresponding to a location of the seal, and a light-emitting surface of the lighting device is directed towards the seal; and
an elastomer disposed in the chamber, wherein the elastomer is compressed by the seal and the second enclosure, generating an elastic force that presses the seal against the first enclosure.

11. The sealing apparatus of claim 10, wherein
the first enclosure comprises a first protrusion extending towards the second enclosure, the second enclosure comprises a second protrusion extending towards the first enclosure and spaced apart from the first protrusion such that the gap is formed; and
the seal comprises a main body, a first end, and a second end, the first end of the seal protruding from the main body towards the first enclosure and matching the first protrusion, the second end of the seal protruding from the main body towards the second enclosure, and the second end of the seal and the second protrusion cooperatively defining the chamber.

12. The sealing apparatus of claim 11, wherein
the first end of the seal defines a first annular recess extending along a circumference of the seal, and
the first protrusion extends along a circumference of the first enclosure, and at least a portion of the first protrusion is located within the first annular recess and abuts a bottom wall of the first annular recess.

13. The sealing apparatus of claim 11, wherein
the first end and the main body of the seal both have an annular cylindrical configuration, and a thickness of the first end is less than a thickness of the main body to form a first flanged surface at an outer side of the seal, and
the first protrusion abuts the first flanged surface.

14. The sealing apparatus of claim 11, wherein
the second end of the seal defines a second annular recess extending along a circumference of the seal, and
the second protrusion extends along a circumference of the second enclosure, and at least a portion of the second protrusion is located within the second annular recess, the second protrusion is spaced apart from a bottom wall of the second annular recess such that the chamber is formed between the bottom wall of the second annular recess and the second protrusion.

15. The sealing apparatus of claim 11, wherein
the second end and the main body of the seal both have an annular cylindrical configuration, and a thickness of the second end is less than a thickness of the main body to form a second flanged surface at an outer side of the seal, and
the second protrusion is spaced apart from the flanged surface such that the chamber is formed between the flanged surface and the second protrusion.

16. The sealing apparatus of claim 10, further comprising:
a processor coupled to the lighting device, wherein the processor is configured to receive robot condition information and to instruct the lighting device to change a lighting mode based on the robot condition information.

17. The sealing apparatus of claim 10, wherein
the first enclosure and the second enclosure cooperatively constitute a pitch joint or a roll joint.

* * * * *